(12) United States Patent
Kurotsu

(10) Patent No.: US 9,444,959 B2
(45) Date of Patent: Sep. 13, 2016

(54) IMAGE READING DEVICE AND IMAGE FORMING APPARATUS INCLUDING THE SAME

(71) Applicant: KYOCERA Document Solutions Inc., Osaka (JP)

(72) Inventor: Yoshihiko Kurotsu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/836,126

(22) Filed: Aug. 26, 2015

(65) Prior Publication Data

US 2016/0065770 A1  Mar. 3, 2016

(30) Foreign Application Priority Data

Aug. 29, 2014 (JP) ................. 2014-175370

(51) Int. Cl.
*H04N 1/04* (2006.01)
*H04N 1/00* (2006.01)
(Continued)

(52) U.S. Cl.
CPC ...... *H04N 1/00559* (2013.01); *H04N 1/00551* (2013.01); *H04N 1/00554* (2013.01); *H04N 1/036* (2013.01); *H04N 1/1065* (2013.01); *H04N 2201/0081* (2013.01)

(58) Field of Classification Search
CPC ............... H04N 1/00; H04N 1/02815; H04N 1/00519; H04N 1/028; H04N 1/0288; H04N 1/04; H04N 1/1013; H04N 1/193; H04N 2201/02402; H04N 2201/02404; G02B 6/0096; G03G 15/2042; G03G 2221/1645
USPC .......... 399/111, 262, 107, 112, 258, 92, 118, 399/301, 334, 45, 67; 382/103, 153; 600/409, 437, 447; 348/E5.091, E7.08, 348/E7.083, 208.11, 211.12, 222.1, 311, 348/335, 373, 787, 789, 794, 836; 358/400, 358/474, 475, 486, 497, 509; 381/300, 386

See application file for complete search history.

(56) References Cited

U.S. PATENT DOCUMENTS

| | | | |
|---|---|---|---|
| 7,426,355 B2 * | 9/2008 | Okabe ................ | G03G 21/1853 399/111 |
| 8,194,194 B2 * | 6/2012 | Kishi ........................ | G09F 9/30 348/787 |
| 9,140,050 B2 * | 9/2015 | Lindgren .............. | E04D 13/031 |

(Continued)

FOREIGN PATENT DOCUMENTS

JP    2002-014496    1/2002

*Primary Examiner* — Negussie Worku
(74) *Attorney, Agent, or Firm* — Wenderoth, Lind & Ponack, L.L.P.

(57) ABSTRACT

An image reading device includes a scanner casing fixed to an upper side of a body frame of an image forming apparatus body, a document pressing member that covers an upper surface of the scanner casing, a leg part provided to be movable with respect to the scanner casing in a vertical direction, a stationary part fixed to an upper end of the leg part, a rotating part connected rotatably to the stationary part via a hinge shaft and supporting the document pressing member, a holding mechanism to hold an opening angle of the document pressing member, and cylindrical parts, passing through the scanner casing in the vertical direction, and having lower end portions fixed to the body frame. The leg part is inserted into the cylindrical part from an upper end opening of the cylindrical part and inclined to a side of the document pressing member.

4 Claims, 7 Drawing Sheets

(51) Int. Cl.
*H04N 1/10* (2006.01)
*H04N 1/036* (2006.01)

(56) References Cited

U.S. PATENT DOCUMENTS

| | | | | |
|---|---|---|---|---|
| 2007/0036581 A1* | 2/2007 | Okabe | ................ | G03G 21/1853 399/111 |
| 2008/0231913 A1* | 9/2008 | Kurotsu | ................ | H04N 1/028 358/474 |
| 2012/0114346 A1* | 5/2012 | Kurotsu | ............. | G03G 15/2042 399/45 |
| 2014/0071500 A1* | 3/2014 | Kurotsu | ............. | H04N 1/00519 358/474 |
| 2014/0131936 A1* | 5/2014 | Shirasaki | ................ | B65H 39/11 271/3.01 |
| 2014/0293368 A1* | 10/2014 | Kurotsu | ................ | G02B 6/0096 358/474 |
| 2014/0313390 A1* | 10/2014 | Uemura | ................ | H04N 5/2254 348/335 |
| 2015/0015920 A1* | 1/2015 | Muraoka | ............ | H04N 1/00554 358/400 |
| 2015/0055196 A1* | 2/2015 | Kurotsu | ................... | H04N 1/00 358/475 |

* cited by examiner

Front side ← Front and rear direction → Rear side

Left side ← Right and left direction → Right side

Fig.6
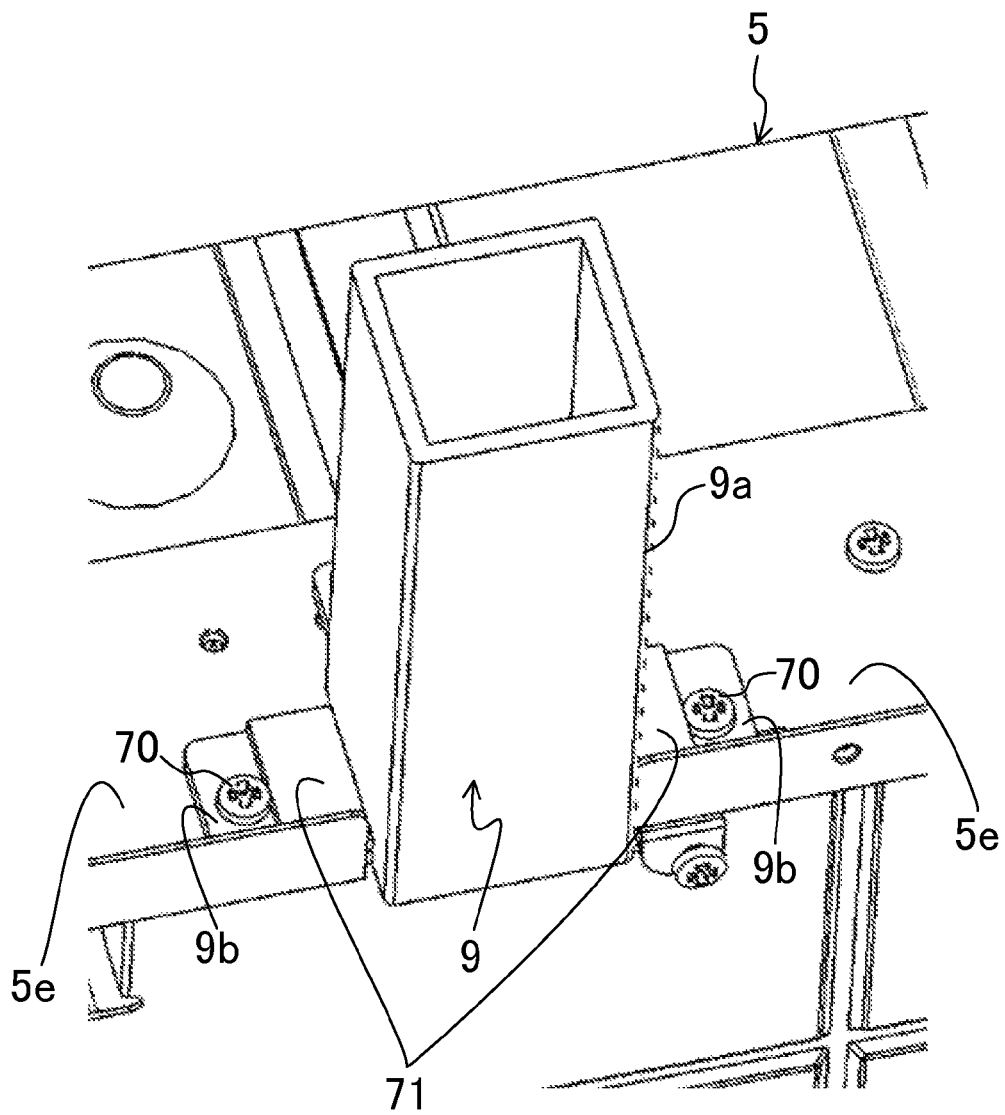

IMAGE READING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-175370 filed on Aug. 29, 2014, the entire contents of which are incorporated herein by reference.

BACKGROUND

The technology of the present disclosure relates to an image reading device and an image forming apparatus including the same.

Conventionally, as an image reading device mounted in an image forming apparatus such as a copy machine, there has been known a device including a scanner casing, an image reading unit, and a document pressing member. The scanner casing is provided on an upper surface thereof with a contact glass on which a document is placed. The image reading unit is accommodated in the scanner casing and reads an image of the document on the contact glass. The document pressing member is a member for pressing the document on the contact glass. The document pressing member is mounted at a rear end portion thereof with a rotating metal fitting. The rotating metal fitting is connected to a stationary metal fitting via a hinge shaft. The stationary metal fitting is fixed to an upper end portion of a leg part extending in a vertical direction. The leg part is inserted into a support hole formed at a rear end portion of an upper surface of the scanner casing. Furthermore, the aforementioned leg part slides in the aforementioned support hole in the vertical direction, so that it is possible to cope with the size of a thickness of the document. A sidewall of the support hole, for example, is formed by a cylindrical part integrally formed with the scanner casing.

The aforementioned image reading device further includes a holding mechanism that holds an opening angle of the document pressing member at an arbitrary angle. The holding mechanism includes a compression spring arranged between the rotating metal fitting and the stationary metal fitting, a retainer that holds the compression spring, and an abutting shaft supported to the stationary metal fitting to abut an inclined surface of the retainer. When the opening angle of the document pressing member is within a predetermined range, the document pressing member is urged to an opening side by urging force of the compression spring, so that the weight of the document pressing member and the urging force of the compression spring are balanced. As a consequence, the document pressing member is held at an arbitrary opening angle.

In the aforementioned image reading device, various technologies have been proposed in order to reduce collision sound when the document pressing member is closed. As one of these various technologies, there is a technology for allowing an inner diameter of the support hole to be larger than an outer diameter of the leg part. In this way, the leg part can be inclined to the document pressing member side in the support hole and can be stretched, resulting in the suppression of a speed when the document pressing member is closed.

SUMMARY

An image reading device according to one aspect of the present disclosure includes a scanner casing provided on an upper surface thereof with a contact glass on which a document is placed, and fixed to an upper side of a body frame of an image forming apparatus body; an image reading unit accommodated in the scanner casing and optically reads an image of the document on the contact glass; a document pressing member that covers an upper surface of the scanner casing so as to be openable and closable; a leg part configured to be movable with respect to the scanner casing in a vertical direction; a stationary part fixed to an upper end of the leg part; a rotating part connected rotatably to the stationary part via a hinge shaft and supporting the document pressing member; and a holding mechanism interposed between the rotating part and the stationary part to apply urging force to the document pressing member in an opening direction, thereby holding an opening angle of the document pressing member at an arbitrary angle.

Furthermore, the image reading device further includes cylindrical parts extending in the vertical direction, passing through the scanner casing in the vertical direction, and having lower end portions fixed to the body frame, wherein the leg part is configured to be inserted into the cylindrical part from an upper end opening of the cylindrical part and to be inclined to a side of the document pressing member in the cylindrical part by a self-weight of the document pressing member.

BRIEF DESCRIPTION OF THE DRAWINGS

FIG. 6 is an enlarged perspective view of one cylindrical part and a periphery thereof.

DETAILED DESCRIPTION

Hereinafter, the present embodiment will be described in detail with reference to the drawings. The technology of the present disclosure is not limited to the following embodiments.

Embodiment

Figure 1:
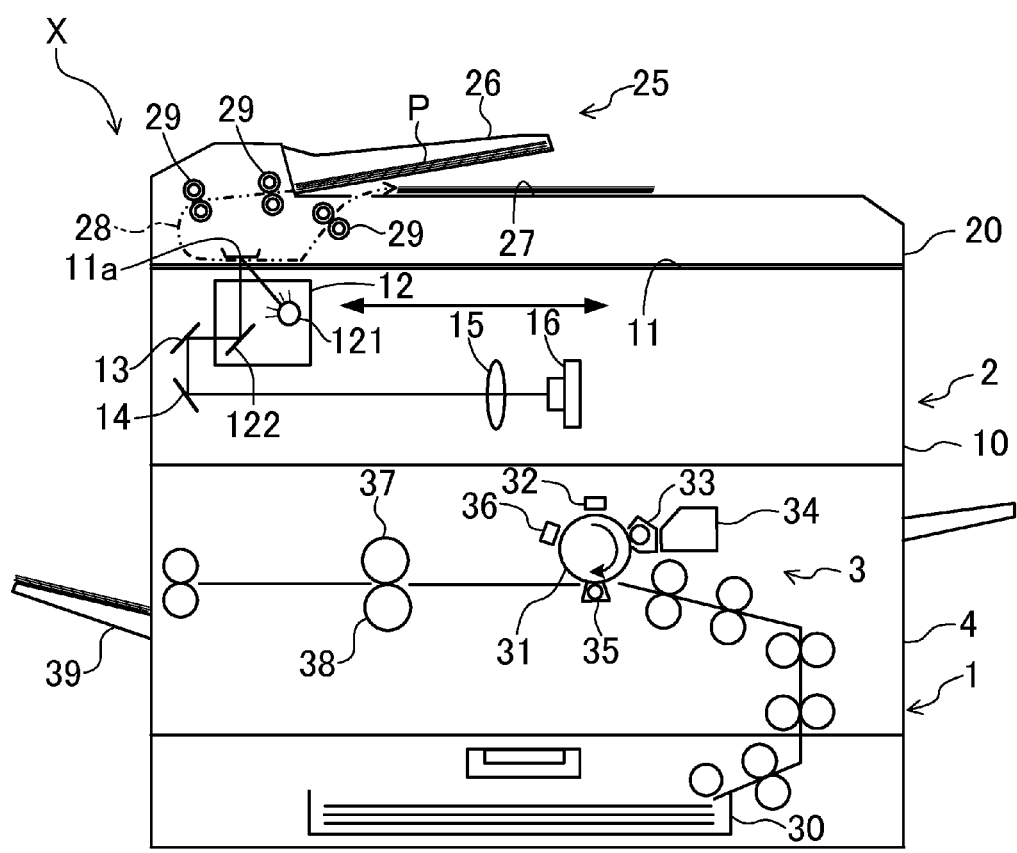
FIG. 1 is a schematic sectional view illustrating an image forming apparatus including an image reading device in an embodiment.

FIG. 1 illustrates a multifunctional peripheral X as an image reading device in an embodiment. The multifunctional peripheral X has an image forming apparatus body 1, and an image reading device 2 fixed to an upper end portion of the image forming apparatus body 1 so as to cover an upper side of the image forming apparatus body 1. The multifunctional peripheral X serves as an electrophotographic image forming apparatus that forms an image on a paper on the basis of image data read in the image reading device 2 or image data input from an information processing apparatus such as an external personal computer. In FIG. 1, in order to make the drawing easy to be seen, a dimension of the image reading device 2 in a height direction is drawn to be larger than an actual dimension. In the following description, unless otherwise specifically mentioned, a left side and a right side indicate a left side and a right side when the multifunctional peripheral X is viewed from a front side (a front side of a direction vertical to the paper surface of FIG. 1), and a front side and a rear side indicate a front side and a rear side of the multifunctional peripheral X.

The aforementioned image forming apparatus body 1 has an image forming unit 3 and a housing 4 that accommodates the image forming unit 3 therein. The image forming unit 3 has a paper feeding cassette 30, a photosensitive drum 31, a charging device 32, a developing device 33, a toner container 34, a transfer roller 35, an electricity removing device 36, a fixing roller 37, and a pressing roller 38. The image forming unit 3 is accommodated in the image forming apparatus body 1. The image forming apparatus body 1 is mounted at a lateral side thereof with a paper discharge tray 39.

In the image forming apparatus body 1, an image is formed on a paper, which is supplied from the aforementioned paper feeding cassette 30, in the following procedure. In detail, firstly, the aforementioned photosensitive drum 31 is uniformly charged with a predetermined potential by the charging device 32. Next, light based on image data is irradiated to the surface of the aforementioned photosensitive drum 31 by a laser scanner unit (LSU: not illustrated). In this way, an electrostatic latent image is formed on the surface of the photosensitive drum 31. Then, the electrostatic latent image on the surface of the photosensitive drum 31 is developed as a toner image by the aforementioned developing device 33. Toner is replenished to the developing device 33 from the aforementioned toner container 34. Subsequently, the toner image formed on the aforementioned photosensitive drum is transferred to a paper by the aforementioned transfer roller 35. Thereafter, the toner image transferred to the paper is heated in the aforementioned fixing roller 37 and is molten and fixed when the paper passes through between the aforementioned fixing roller 37 and the aforementioned pressing roller 38. The potential of the aforementioned photosensitive drum 31 is removed by the aforementioned electricity removing device 36.

Figure 2:
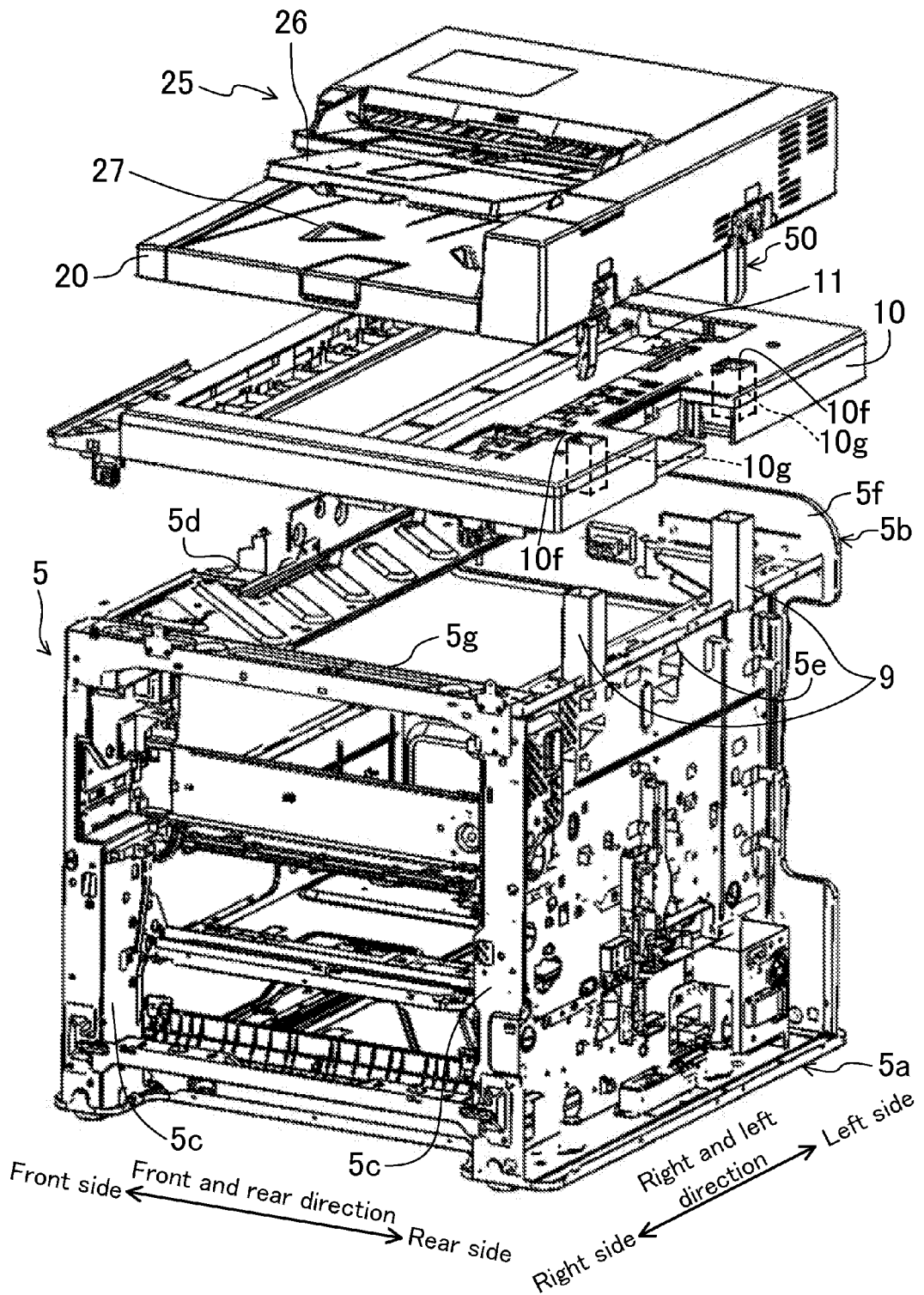
FIG. 2 is an exploded perspective view of an image forming apparatus.

As illustrated in FIG. 2, the housing 4 of the image forming apparatus body 1 has a body frame 5 made of a metal, and a sheet metal cover (not illustrated) mounted at each front, rear, right, and left side of the body frame 5. The body frame 5 has a lower rectangular frame part 5a and an upper rectangular frame part 5b arranged spaced apart from each other in a vertical direction, and four columnar parts 5c extending in the vertical direction to connect both frame parts 5a and 5b to each other (FIG. 2 illustrates only two columnar parts 5c positioned at the right end portions of the image forming apparatus body 1). The upper rectangular frame part 5b has a front side portion 5d and a rear side portion 5e arranged spaced apart from each other in parallel with each other in the front and rear direction, and a left side portion 5f and a right side portion 5g arranged spaced apart from each other in parallel with each other in the right and left direction.

Returning to FIG. 1, the aforementioned image reading device 2 includes a scanner casing 10, a contact glass 11, a reading unit 12, mirrors 13 and 14, an optical lens 15, and a CCD sensor 16.

The scanner casing 10 is configured with a box-shaped body having a rectangular shape when viewed from a plan view, and is fixed to an upper surface of the upper rectangular frame part 5b of the aforementioned body frame 5 (see FIG. 2) by using a bolt and the like. The aforementioned contact glass is mounted on the upper surface of the aforementioned scanner casing 10 and forms a document table on which a document P serving as an image reading target of the aforementioned multifunctional peripheral X is placed.

The aforementioned reading unit 12 moves in a sub-scanning direction (the right and left direction of FIG. 1) while irradiating light toward a document on the contact glass 11 by an LED light source 121, and reflects reflected light from the document by a mirror 122 in a horizontal direction at the time of image reading. The aforementioned mirrors 13 and lead the reflected light from the mirror 122 to the CCD sensor 16. The CCD sensor 16 performs photoelectric conversion of the received light to generate image data of a document image. The generated image data is stored in a data storage unit (not illustrated). In this way, the aforementioned image reading device 2 optically reads an image (a document image) of the aforementioned document P placed on the aforementioned contact glass 11, and generates image data thereof.

The upper surface of the aforementioned scanner casing 10 is covered by a document cover 20 serving as a document pressing member so as to be openable and closable. In the present embodiment, the document cover 20 is integrally formed with an automatic document feeder 25 (a so-called ADF). The automatic document feeder 25 has a document feeding tray 26, a document discharge tray 27 provided at a lower side of the document feeding tray 26, and a U-shaped document conveyance path 28 from the document feeding tray 26 to the document discharge tray 27. The automatic document feeder 25 sends documents on the document feeding tray 26 to a downstream side one by one by a plurality of conveying rollers 29 arranged along the document conveyance path 28, allows the documents to pass through a document reading position 11a set on the contact glass 11, and discharges the documents to the document discharge tray 27. The CCD sensor 16 reads images of the documents passing through the document reading position 11a, and generates image data thereof.

Figure 3:
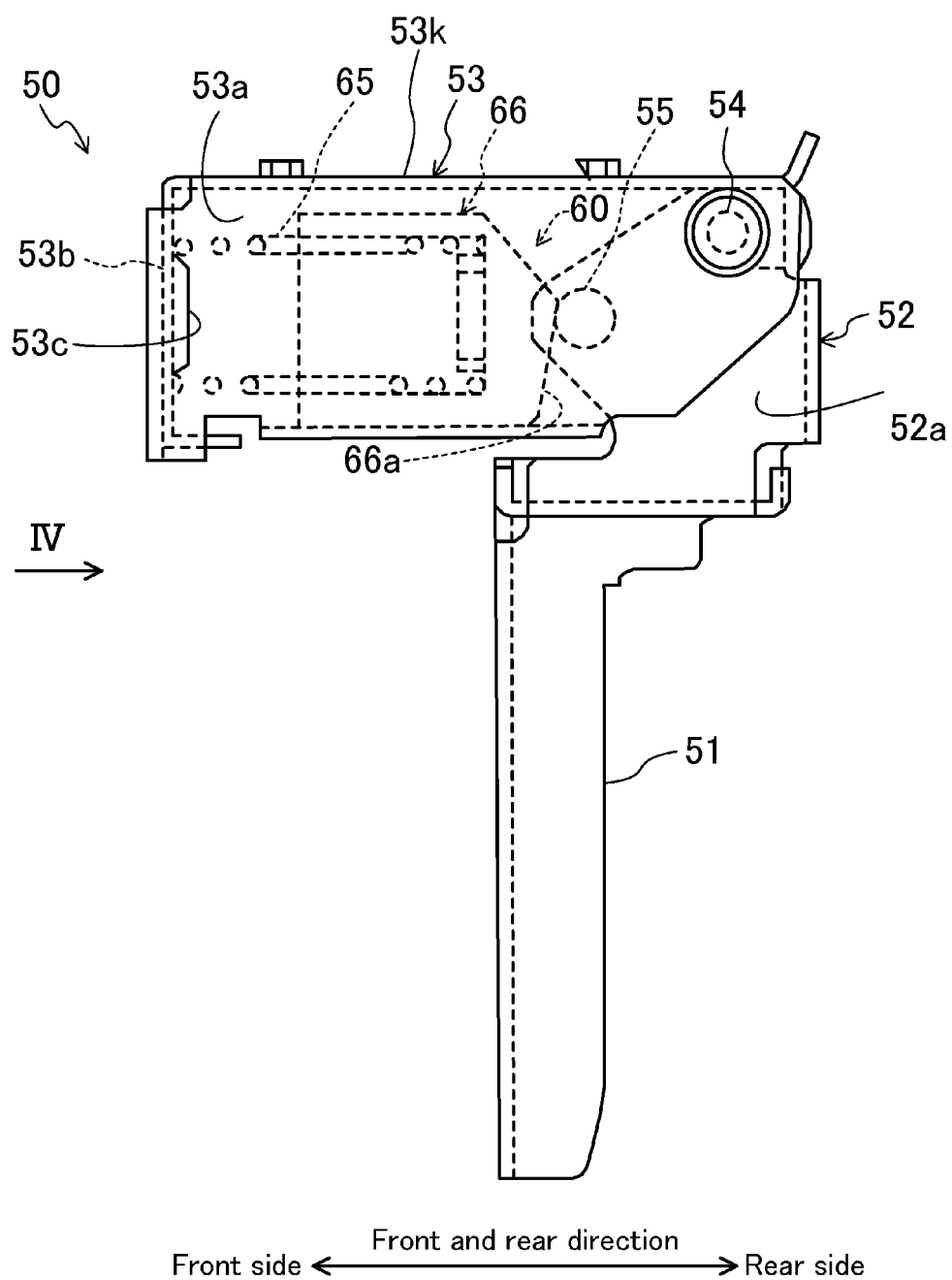
FIG. 3 is a side view illustrating a hinge mechanism.
Figure 4:
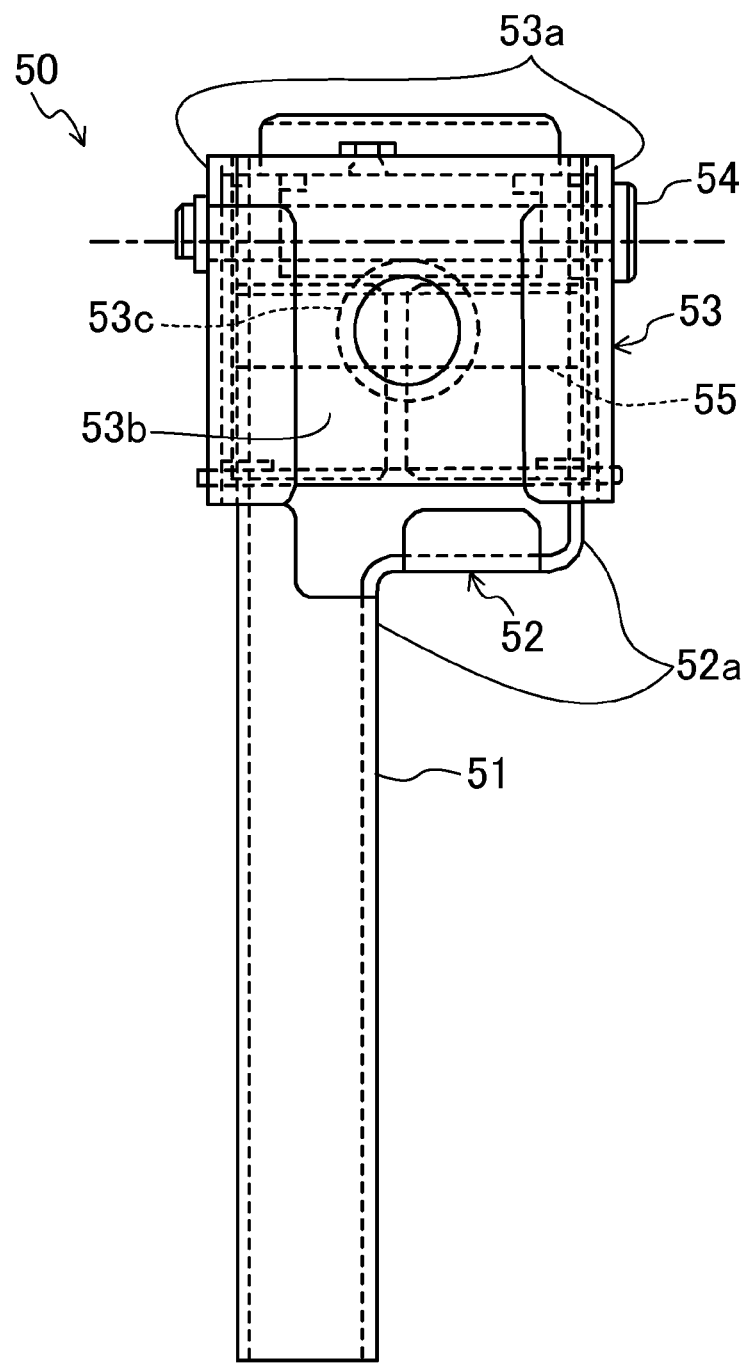
FIG. 4 is a view viewed in the arrow direction of IV of FIG. 3.

The aforementioned document cover 20 is mounted at a rear end portion thereof with a pair of hinge mechanisms 50 arranged spaced apart from each other in the right and left direction. Since both hinge mechanisms 50 have a similar configuration, only the right hinge mechanism 50 will be described below. As illustrated in FIG. 3 and FIG. 4, the hinge mechanism 50 has a leg part 51 extending in the vertical direction, a stationary part 52 fixed to an upper end portion of the leg part 51, and a rotating part 53 connected rotatably to the stationary part 52 via a hinge shaft 54.

The leg part 51 and the stationary part 52 are formed by bending one common metal plate. The leg part 51 is formed in a sectional channel shape opened rearward.

The stationary part 52 has a pair of sidewall portions 52a arranged spaced apart from each other in the right and left direction. At the upper end portions of the pair of sidewall portions 52a, both ends of the aforementioned hinge shaft 54 are supported. At an intermediate portion of the pair of sidewall portions 52a in the vertical direction, both ends of an abutting shaft 55, which abuts a retainer 66 to be described later, are supported.

The rotating part 53 is formed by bending a metal plate separate from that of the leg part 51 and the stationary part 52. The rotating part 53 has a pair of sidewall portions 53a arranged spaced apart from each other in the right and left direction. The pair of sidewall portions 53a are connected to each other via an upper wall portion 53k. Base end portions of the pair of sidewall portions 53a are supported rotatably to the hinge shaft 54. A front end portion of the upper wall portion 53k is bent toward an inner side of the pair of sidewall portions 53a at an approximately right angle to form a front wall portion 53b. Referring to FIG. 3 and FIG. 4, the rotating part 53 is arranged so as to cover the stationary part 52 from an upper side, and is arranged such that both sidewall portions 53a of the rotating part 53 cover both sidewall portions 52a of the stationary part 52 from both sides. The sidewall portions 53a and the sidewall portions 52a are respectively connected to each other via the hinge shaft 54, so that the rotating part 53 is connected rotatably to the stationary part 52 via the hinge shaft 54. When viewed from the right and left direction, in the state (the state of FIG. 3) in which the rotating part 53 is perpendicular to the leg part 51, a predetermined interval is formed between the front wall portion 53b of the rotating part 53 and the abutting shaft 55 of the stationary part 52. Between the front wall portion 53b of the rotating part 53 and the abutting shaft 55, a holding mechanism 60 is provided to hold an opening angle of the document cover 20 at an arbitrary angle by applying urging force in an opening direction to the document cover 20. The holding mechanism 60 includes a compression coil spring 65 and an approximately cup-shaped retainer 66. One end portion of the compression coil spring 65 is fitted on a positioning protrusion 53c of the front wall portion 53b, and the other end portion of the compression coil spring 65 is accommodated in the retainer 66. The retainer 66 is accommodated in a rectangular space of an inner side of the rotating part 53. At a rear end portion of the retainer 66, an inclined plane 66a is formed. The inclined plane 66a is inclined to the front side toward a lower side when viewed from the right and left direction.

Figure 5:
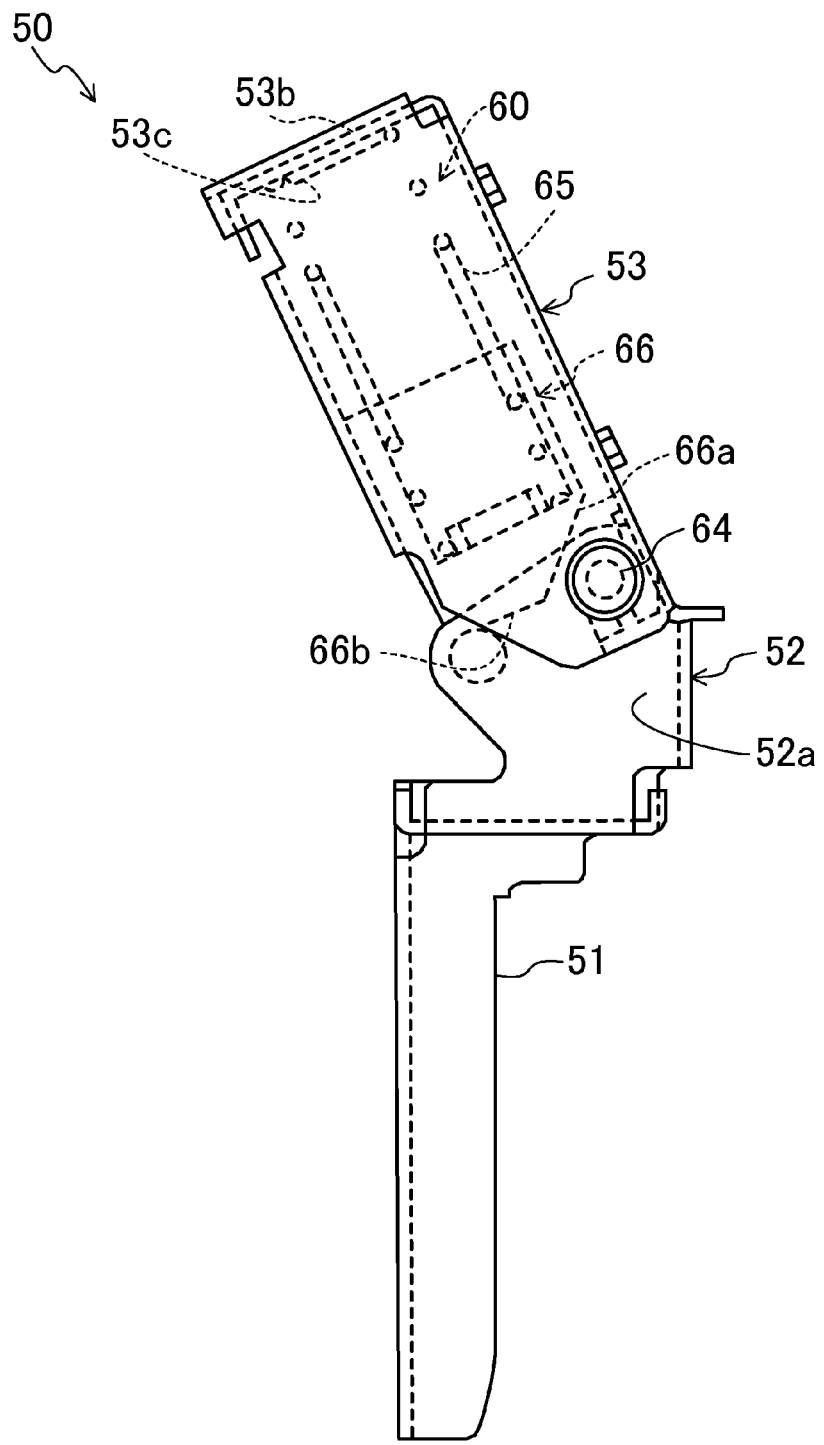
FIG. 5 is a side view of a hinge mechanism, which illustrates the state in which a rotating part has been rotated in an opening direction.

With reference to FIG. 3 and FIG. 5, operations of the hinge mechanism 50 and the holding mechanism 60 when the document cover 20 is opened and closed will be described. As illustrated in FIG. 3, in the state in which the document cover 20 has been positioned at a closed position, the rotating part 53 is arranged perpendicular to the leg part 51. In this state, the compression coil spring 65 urges the rotating part 53 to the stationary part 52 in a closed direction around the hinge shaft 54. When the document cover 20 is rotated by a user's hand in an opening direction (a clockwise direction of FIG. 3) and exceeds a predetermined neutral position, since the urging force of the compression coil spring 65 overcomes or balances with the angular moment of the closed direction due to the self-weight of the document cover 20, the document cover 20 is held at an arbitrary opening angle (see FIG. 5). FIG. 5 illustrates that the leg part 51 extends in a vertical direction, but actually, the leg part 51 is inclined with respect to the vertical direction (see FIG. 7) as will be described later. When the document cover 20 is rotated from the state of being held at the arbitrary opening angle to the closed direction (a counterclockwise direction of FIG. 5) and exceeds the predetermined neutral position downward, the document cover 20 is urged in the closed direction around the hinge shaft 54 by the compression coil spring 65. As a consequence, the document cover 20 is positioned at the closed position illustrated in FIG. 3.

The aforementioned leg part 51 is inserted from an upper side into a cylindrical part 9 vertically installed at the rear side portion 5e of the body frame 5, and can slide (move) in the cylindrical part 9 in the vertical direction. Consequently, a user can lift the document cover 20 up with his/her hand so as to be able to slide it up and down. In this way, it is possible to cope with the size of a thickness of a document.

As illustrated in FIG. 6, the aforementioned cylindrical part 9 has a cylindrical body 9a with a rectangular cylindrical shape, which extends in the vertical direction and fixed seat portions 9b respectively protruding from a lower end portion of the cylindrical body 9a to both right and left sides thereof. The fixed seat portions 9b are fixed to an upper surface (that is, a support surface that supports the scanner casing 10) of the rear side portion 5e of the aforementioned body frame 5 by a bolt 70. Each fixed seat portion 9b is mounted at an upper surface thereof with a vibration absorbing member 71. The vibration absorbing member 71, for example, is made of a sheet material such as rubber and urethane, and is fixed to the upper surface of the fixed seat portion 9b by an adhesive and the like. The vibration absorbing member 71 abuts the lower surface of the scanner casing 10 in the state in which the scanner casing 10 has been fixed to the upper side of the body frame 5. Furthermore, the vibration absorbing member 71 plays a role of absorbing vibration (for example, rotational vibration and the like of the photosensitive drum 31 or the fixing roller 37) generated by the image forming apparatus body 1 side.

The scanner casing 10 is formed at a rear side end portion thereof from the contact glass 11 with a pair of through holes 10f (see FIG. 2) through which a pair of cylindrical parts 9 pass. The pair of through holes 10f are formed spaced apart from each other in the right and left direction. Each through hole 10f includes a square column-shaped hole extending in the vertical direction. Each through hole 10f is formed by a through hole forming cylindrical part 10g having a rectangular cylindrical shape. Each through hole forming cylindrical part 10g vertically extends from an upper wall portion to a lower wall portion of the scanner casing 10. An outer side surface of each cylindrical part 9 protruding from the aforementioned body frame 5 is tightly fitted into an inner wall surface (that is, an inner wall surface of each through hole forming cylindrical part 10g) of each through hole 10f of the scanner casing 10.

Figure 7:
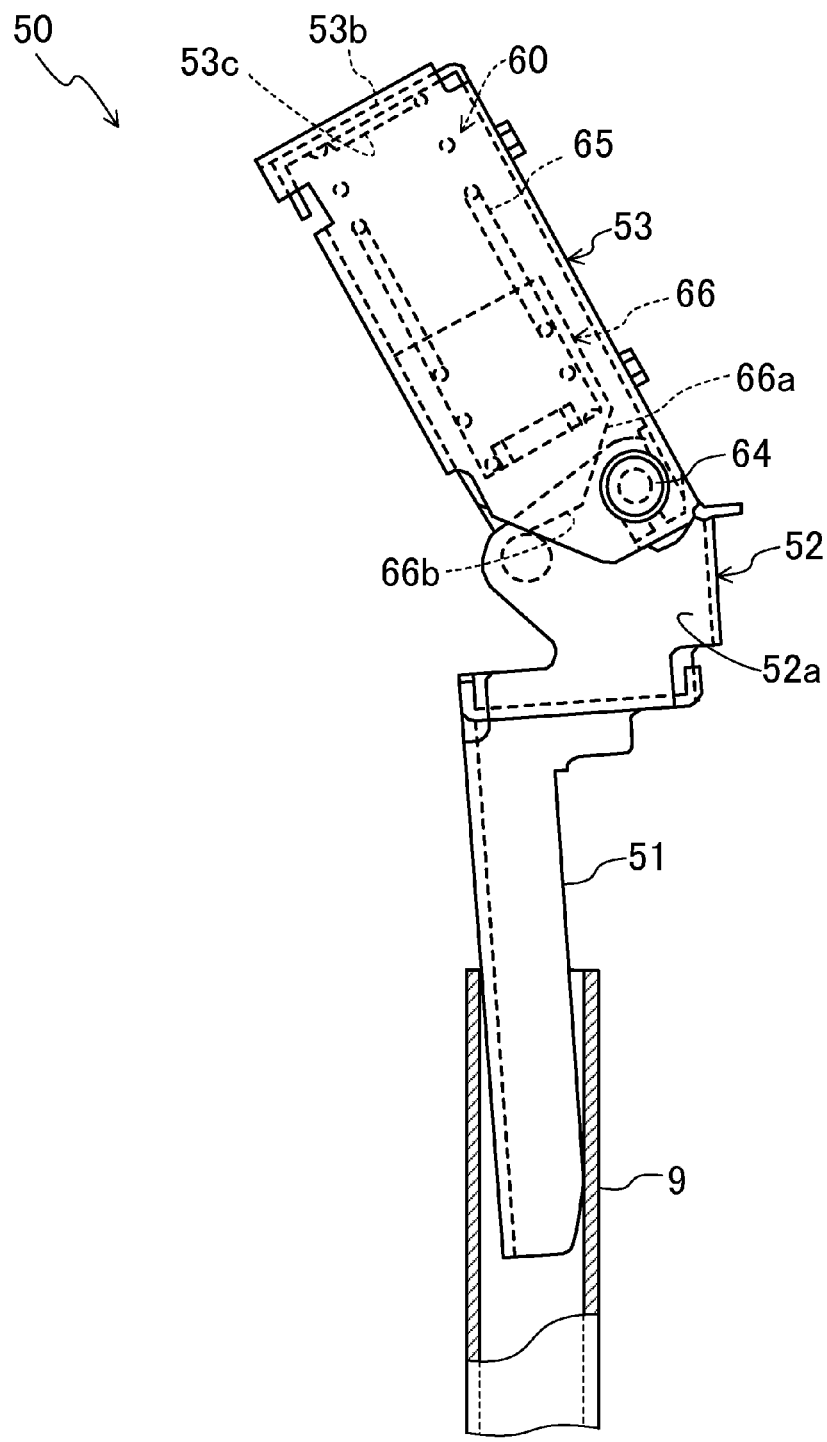
FIG. 7 is a side view of a hinge mechanism, which illustrates the state in which a leg part has been inclined in a cylindrical part by a self-weight of a document pressing member.

An interval between the right and left walls of the aforementioned cylindrical part 9 is set to be equal to a dimension of the leg part 51 in the right and left direction, but an interval between the front and rear walls of the cylindrical part 9 is set to be larger than a dimension of the leg part 51 in the front and rear direction. In this way, as illustrated in FIG. 7, the leg part 51 is inclined to the front side in the cylindrical part 9 by the self-weight of the document cover 20 and is stretched, so that it is possible to minimize a speed when the document cover 20 is closed. In this way, it is possible to suppress collision sound when the document cover 20 is closed and thus to reduce discomfort feeling of a user.

Herein, in the conventional image reading device 2, for example, the leg part 51 is configured to be inserted into the resinous through hole forming cylindrical part 10g (the through hole 10f) integrally formed with the scanner casing 10. Consequently, as described above, in the case of employing a scheme of reducing the speed when the document cover 20 is closed by allowing the leg part 51 to be inclined to the front side by the self-weight of the document cover 20, it is probable that the through hole forming cylindrical part 10g is broken or deformed due to a load applied to the through hole forming cylindrical part 10g by the leg part 51.

On the other hand, in the present embodiment, the cylindrical part 9, into which the leg part 51 is inserted, is fixed to the body frame 5 of the image forming apparatus body 1, so that it is possible to considerably enhance stiffness of the cylindrical part 9. Thus, when the leg part 51 is stretched in the cylindrical part 9, it is possible to prevent the cylindrical part 9 from being broken or deformed by a load from the leg part 51.

Furthermore, in the present embodiment, the cylindrical part 9 is configured to be made of a metal material, so that it is possible to enhance the stiffness of the cylindrical part 9 as much as possible as compared with the case in which the cylindrical part 9 is made of a resin material. Thus, it is possible to more reliably prevent the aforementioned cylindrical part 9 from being broken and deformed.

Furthermore, the cylindrical part 9 is fitted into the through hole 10f formed at the rear end portion of the scanner casing 10 and passes through the scanner casing 10 in the vertical direction. Consequently, when setting the scanner casing 10 at the upper side of the body frame 5 in an assembly process of the image forming apparatus body 1, the cylindrical part 9 serves as a positioning member of the scanner casing 10 for the body frame 5. Consequently, it is not necessary to separately provide a positioning mechanism of the scanner casing 10 for the body frame 5. Thus, it is possible to reduce the entire cost of the apparatus 1. Furthermore, in the present embodiment, two cylindrical parts 9 serving as the positioning member are provided, so that it is possible to easily and accurately perform the positioning of the scanner casing 10 for the body frame 5.

Furthermore, in the present embodiment, the cylindrical part 9 has the cylindrical body 9a extending in the vertical direction and the fixed seat portions 9b connected to the lower end portion of the cylindrical body 9a and fixed to the support surface that supports the scanner casing 10 in the body frame 5, and the fixed seat portion 9b is mounted at the upper surface thereof with the vibration absorbing member 71 that absorbs vibration generated by the image forming apparatus body 1 side.

According to such a configuration, it is possible to absorb vibration, which is transferred to the cylindrical body 9a via the fixed seat portions 9b by the image forming apparatus body 1 side, by the vibration absorbing member 71 mounted at the fixed seat portions 9b. Consequently, it is possible to prevent the cylindrical body 9a from being broken or deformed by the vibration from the image forming apparatus body 1 side.

OTHER EMBODIMENTS

The technology of the present disclosure may also have the following configurations with respect to the aforementioned embodiment.

That is, in the aforementioned embodiment, the multifunctional peripheral X has been described as an example of an image forming apparatus. However, the image forming apparatus is not limited to the multifunctional peripheral X, and for example, may be a multifunctional peripheral, a printer and the like.

In the aforementioned embodiment, the cylindrical part 9 is configured to be made of a metal material; however, the technology of the present disclosure is not limited thereto. The cylindrical part 9 may also be configured to be made of a resin material.

Furthermore, in the aforementioned embodiment, the document cover 20 is integrally formed with the automatic document feeder 25. However, the automatic document feeder 25 is not always necessary.

What is claimed is:

1. An image reading device comprising:
    a scanner casing provided on an upper surface thereof with a contact glass on which a document is placed, the scanner casing being fixed to an upper side of a body frame of an image forming apparatus body;
    an image reading unit accommodated in the scanner casing, the image reading unit optically reading an image of the document on the contact glass;
    a document pressing member that covers an upper surface of the scanner casing so as to be openable and closable;
    a leg part configured to be movable with respect to the scanner casing in a vertical direction;
    a stationary part fixed to an upper end of the leg part;
    a rotating part connected rotatably to the stationary part via a hinge shaft and supporting the document pressing member;
    a holding mechanism interposed between the rotating part and the stationary part to apply urging force to the document pressing member in an opening direction, thereby holding an opening angle of the document pressing member at an arbitrary angle;
    a cylindrical part extending in the vertical direction, and having a lower end portion fixed to the body frame; and
    a vibration absorbing member that is provided between an upper surface of the body frame and a lower surface of the scanner casing, the vibration absorbing member absorbing vibration generated by a side of the image forming apparatus body,
    wherein the scanner casing has a through hole that vertically extends from an upper wall portion to a lower wall portion of the scanner casing, the cylindrical part passing through the through hole, and
    wherein the leg part is configured to be inserted into the cylindrical part from an upper end opening of the cylindrical part and to be inclined to a side of the document pressing member in the cylindrical part by a self-weight of the document pressing member.

2. The image reading device of claim 1, wherein the cylindrical part has a cylindrical body extending in the vertical direction and a fixed seat portion connected to a lower end portion of the cylindrical body and fixed to a support surface that supports the scanner casing in the body frame, and the fixed seat portion is mounted with the vibration absorbing member body.

3. The image reading device of claim 1, wherein the leg part is two leg parts, the stationary part is two stationary parts, the rotating part is two rotating parts, the holding mechanism is two holding mechanisms, and the cylindrical part is two cylindrical parts.

4. An image forming apparatus comprising:
    the image reading device of claim 1; and
    an image forming unit accommodated in the image forming apparatus body, the image forming unit printing the image of the document read by the image reading device on a paper.

* * * * *